(12) United States Patent
Wang et al.

(10) Patent No.: US 8,532,910 B2
(45) Date of Patent: Sep. 10, 2013

(54) METHOD AND APPARATUS TO DETERMINE A CYLINDER AIR CHARGE FOR AN INTERNAL COMBUSTION ENGINE

(75) Inventors: Yue-Yun Wang, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 13/109,040

(22) Filed: May 17, 2011

(65) Prior Publication Data

US 2012/0296546 A1    Nov. 22, 2012

(51) Int. Cl.
*F02D 41/18* (2006.01)

(52) U.S. Cl.
USPC .......................... 701/103; 123/403; 73/114.33

(58) Field of Classification Search
USPC ...... 701/103, 110; 123/399, 403; 73/114.31, 73/114.32, 114.33, 114.76
See application file for complete search history.

(56) References Cited

U.S. PATENT DOCUMENTS

| | | | | |
|---|---|---|---|---|
| 5,520,161 | A | * | 5/1996 | Klopp ........................... 123/676 |
| 5,714,683 | A | * | 2/1998 | Maloney .................... 73/114.33 |
| 5,753,805 | A | * | 5/1998 | Maloney .................... 73/114.32 |
| 6,820,600 | B1 | * | 11/2004 | Sisken et al. ............. 123/568.21 |
| 7,067,319 | B2 | * | 6/2006 | Wills et al. ...................... 436/37 |
| 7,319,929 | B1 | | 1/2008 | Davis et al. |
| 7,448,369 | B2 | | 11/2008 | Robinson et al. |
| 7,805,235 | B2 | * | 9/2010 | Sujan et al. ................... 701/103 |
| 7,865,291 | B2 | * | 1/2011 | Muller ......................... 701/103 |
| 2002/0133286 | A1 | | 9/2002 | Kolmanovsky et al. |

OTHER PUBLICATIONS

U.S. Appl. No. 13/109,062, Wang, et al.

* cited by examiner

*Primary Examiner* — Hai Huynh

(57) ABSTRACT

A method for determining a cylinder air charge for an internal combustion engine includes determining engine operating parameters including an intake air charge density, an engine delta pressure as a ratio of an intake manifold pressure to an exhaust pressure, and an engine speed. An open-throttle volumetric efficiency corresponding to the engine operating parameters is determined, and a closed-throttle volumetric efficiency corresponding to the engine operating parameters is also determined. The cylinder air charge is determined using a selected one of the open-throttle volumetric efficiency and the closed-throttle volumetric efficiency.

11 Claims, 4 Drawing Sheets

METHOD AND APPARATUS TO DETERMINE A CYLINDER AIR CHARGE FOR AN INTERNAL COMBUSTION ENGINE

TECHNICAL FIELD

This disclosure is related to internal combustion engines.

BACKGROUND

The statements in this section merely provide background information related to the present disclosure. Accordingly, such statements are not intended to constitute an admission of prior art.

Known internal combustion engine systems combust mixtures of air and fuel in cylinders to generate mechanical power that drives pistons and thus generates torque. Engine control systems control engine operation to generate engine power that is responsive to an operator torque request while accounting for fuel economy and emissions requirements. Known engine control systems monitor control and operating parameters to estimate or otherwise determine an engine mass airflow and control engine fueling.

Engine fueling is controlled by determining the engine mass airflow, determining a cylinder air charge for an individual cylinder based thereon, and calculating a preferred mass of fuel that corresponds to the cylinder air charge to meet the operator torque request in view of fuel economy and emissions requirements.

SUMMARY

A method for determining a cylinder air charge for an internal combustion engine includes determining engine operating parameters including an intake air charge density, an engine delta pressure as a ratio of an intake manifold pressure to an exhaust pressure, and an engine speed. An open-throttle volumetric efficiency corresponding to the engine operating parameters is determined, and a closed-throttle volumetric efficiency corresponding to the engine operating parameters is also determined. The cylinder air charge is determined using a selected one of the open-throttle volumetric efficiency and the closed-throttle volumetric efficiency.

BRIEF DESCRIPTION OF THE DRAWINGS

One or more embodiments will now be described, by way of example, with reference to the accompanying drawings.

DETAILED DESCRIPTION

Figure 1:
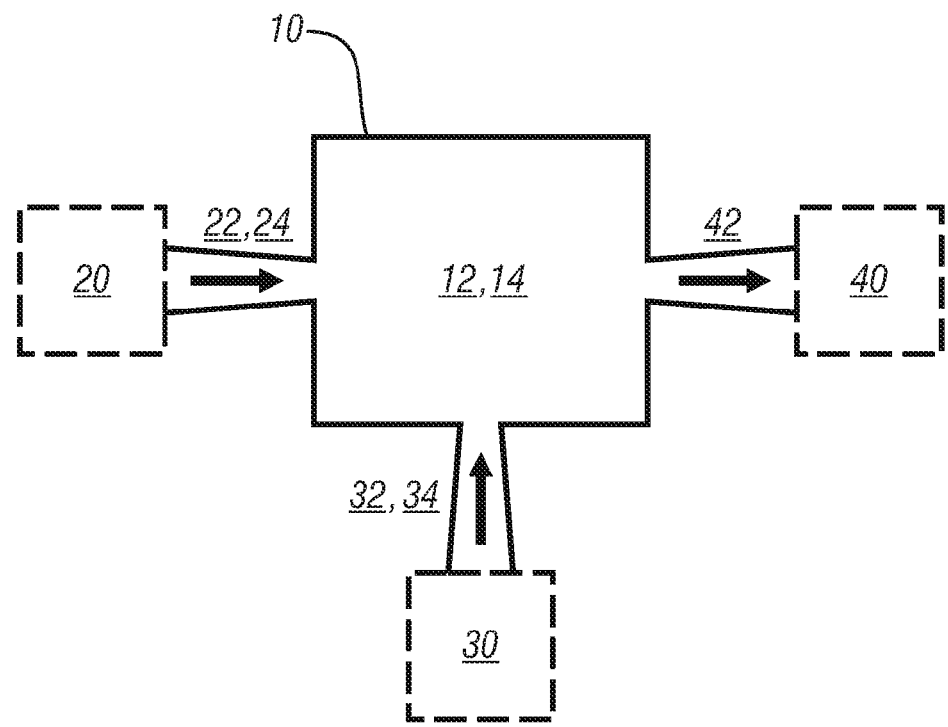
FIG. 1 illustrates an intake manifold for an internal combustion engine including an intake system and an exhaust gas recirculation (EGR) system in accordance with the present disclosure.

Referring now to the drawings, wherein the showings are for the purpose of illustrating certain exemplary embodiments only and not for the purpose of limiting the same, FIG. 1 schematically depicts an intake manifold 10 for an internal combustion engine, including an intake system 20 and an exhaust gas recirculation (EGR) system 30. Input and operating parameters include an intake air flowrate 22, an intake air temperature 24, an EGR flowrate 32, and an EGR temperature 34. As is appreciated, the input and operating parameters may be directly monitored using on-board sensors or may be otherwise determined. For example, engine speed, throttle position, and temperatures and pressures (including for intake and exhaust manifolds and ambient surroundings) may be directly sensed via hardware well known in the art. Other parameters for the engine may be readily determined through various relationships of such sensed quantities. The intake system 20 may be naturally aspirated or may employ an air compressor device such as a turbocharger or a supercharger and an accompanying intercooler for cooling intake air temperature upstream of the intake manifold 10. Parameters associated with the intake air charge in the intake manifold 10 include manifold air pressure 12 and an intake air charge temperature 14. The intake air and recirculated exhaust gas are channeled through the intake manifold 10 to engine cylinders 40, and is characterized by a cylinder air charge flow 42.

Pressure dynamics in the intake manifold 10 may be represented by the following equation derived based upon system enthalpy as set forth in Eq. 1 below:

$$\dot{P}_i = \frac{\gamma R}{V_i} \cdot T_a \cdot W_a + \frac{\gamma R}{V_i} \cdot T_{egr} \cdot W_{egr} - \frac{\gamma R}{V_i} \cdot T_i \cdot W_e \quad [1]$$

wherein
$P_i$ is the manifold air pressure 12,
$\dot{P}_i$ is the rate of change in the manifold air pressure 12,
$V_i$ is a displaced air volume of the intake manifold 10,
$T_a$ is the intake air temperature 24, including intake air temperature after an intercooler on systems so equipped,
$T_{egr}$ is the EGR temperature 34,
$W_a$ is intake air flow 22,
$W_{egr}$ is the EGR flowrate 32,
$T_i$ is the intake air charge temperature 14,
$W_e$ is a cylinder air charge flow,
R is an ideal gas constant, and
γ is specific heat of the gas.

Eq. 1 may be reformed into a speed density equation to estimate the cylinder air charge flow $W_e$ as follows:

$$W_e = \eta_v \frac{V_d}{120} \frac{P_i}{R \cdot T_i} \cdot N \quad [2]$$

wherein
$V_d$ is volumetric displacement of the engine cylinders,
N is rotational speed of the engine, and
$\eta_v$ is a volumetric efficiency of the engine.

Determining the cylinder air charge flow $W_e$ on systems using either a turbocharger or a supercharger and associated intercooler may differ from a naturally aspirated engine in that mass air flow of air is boosted by the compressor and mass air temperature is reduced by the intercooler, EGR flowrates may vary, and the intake manifold pressure may be boosted and may be greater than ambient air pressure. Furthermore, the exhaust pressure may be highly variable, depending on operating states of the turbocharger or supercharger such as an opening position of a variable gate turbocharger, thus affecting engine breathing dynamics. Therefore, volumetric efficiency may depend upon exhaust parameters including exhaust temperature and exhaust pressure. The exhaust temperature and exhaust pressure may be affected by factors associated with interactions of exhaust aftertreatment systems.

The volumetric efficiency is used to quantify an efficiency of air induction. For a naturally aspirated engine operating at stoichiometry, volumetric efficiency may be modeled in relation to the engine speed and the intake manifold pressure. For other engine systems, e.g., a turbo-charged diesel operating with high-rates of recirculated exhaust gas through an EGR system, the volumetric efficiency may be modeled in relation to engine operating parameters including the engine speed N, the intake manifold pressure $P_i$, the intake manifold temperature $T_i$, the exhaust manifold pressure $P_x$, and the exhaust manifold temperature $T_x$ represented as follows.

$$\eta_v = f(N, P_i, T_i, P_x, T_x) \quad [3]$$

Engine input parameters including an intake air charge density $x_1$, an engine delta pressure $x_2$, and engine speed $x_3$ may be developed for a volumetric efficiency model, using the engine operating parameters including the engine speed N, the intake manifold pressure $P_i$, the intake air charge temperature $T_i$, the exhaust manifold pressure $P_x$, calculated as set forth below in Eqs. 4 through 6.

$$x_1 = \frac{P_i}{RT_i} \quad [4]$$

$$x_2 = \frac{P_x}{P_i} \quad [5]$$

$$x_3 = N \quad [6]$$

The engine input parameters including the intake air charge density $x_1$, the engine delta pressure $x_2$, and the engine speed $x_3$ have been found to dominate a volumetric efficiency model, thus permitting determining a range of volumetric efficiency values correlated to those engine input parameters.

Figure 2:
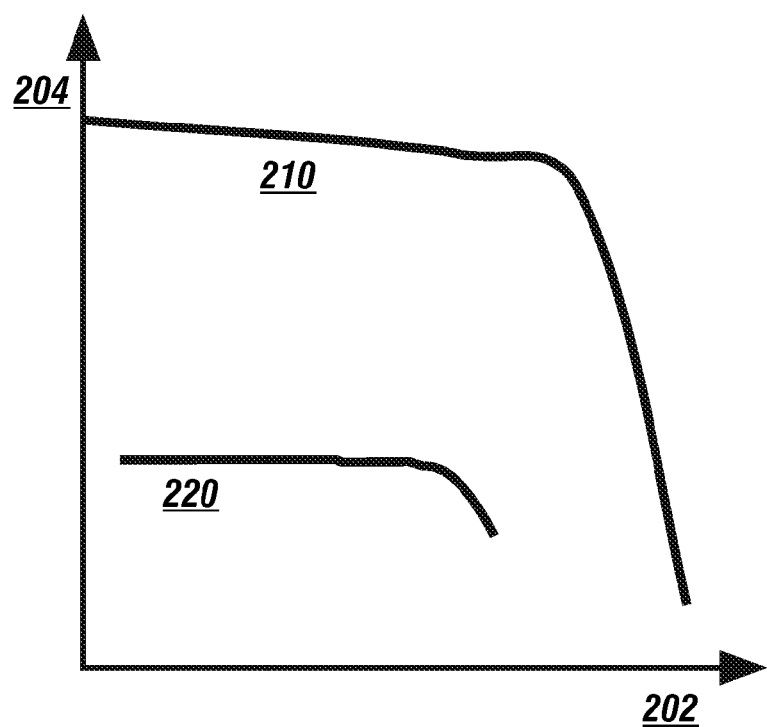
FIG. 2 illustrates a structure for a multi-zone non-linear model to determine volumetric efficiency in accordance with the present disclosure.

FIG. 2 graphically shows a structure for a multi-zone non-linear model to determine volumetric efficiency. The non-linear model is partitioned into first and second zones that are distinguishable based upon engine speed 202 and load 204. The first and second zones are distinguished based upon throttle position, with the first zone (Zone 1) 210 associated with any open-throttle condition and the second zone (Zone 2) 220 associated with a closed-throttle condition. Engine operation in Zone 1 210 is preferably associated with engine operation in one set of known combustion modes, e.g., stoichiometry or lean operation at open-throttle conditions.

Engine operation in Zone 2 220 is associated with engine operation in another set of known combustion and engine operating modes, e.g., cold-start and engine warm-up, engine idle operation, particulate filter regeneration, LNT regeneration, and low temperature combustion. In Zone 1 210 and Zone 2 220, the volumetric efficiency model is decomposed into two stages, with each of the stages exhibiting a smooth surface. The smooth surface permits relatively smooth transitions for estimating volumetric efficiency, thus minimizing volumetric efficiency discontinuities and associated combustion instability. It is appreciated that either of Zone 1 210 and Zone 2 220 may be further subdivided.

When operating in Zone 1 210 associated with the open-throttle condition, a first initial volumetric efficiency $\bar{\eta}_v(a)$ corresponds to the intake air charge density $x_1$ and the engine speed $x_3$, and is normalized for the intake manifold pressure $P_i$, which may include boost pressure associated with operation of a turbocharger or supercharger as graphically depicted in FIG. 4 and in the following relationship.

$$\bar{\eta}_v(a) = \frac{1}{P_i} g(x_1, x_3) \quad [7]$$

An effective volumetric efficiency $\eta_v$ corresponds to the first initial volumetric efficiency $\bar{\eta}_v(a)$ and the engine delta pressure $x_2$ as follows.

$$\eta_v = f(\bar{\eta}_v(a), x_2) \quad [8]$$

Figure 4:
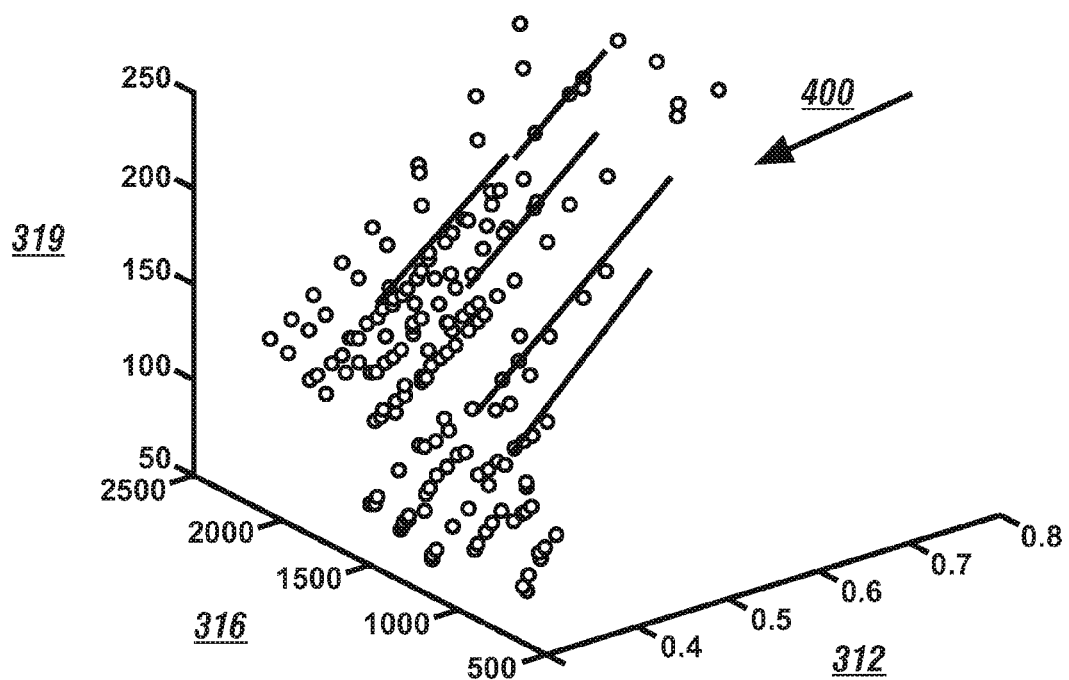
FIG. 4 illustrates a first initial volumetric efficiency correlated to intake air charge density and engine speed in accordance with the present disclosure.
Figure 5:
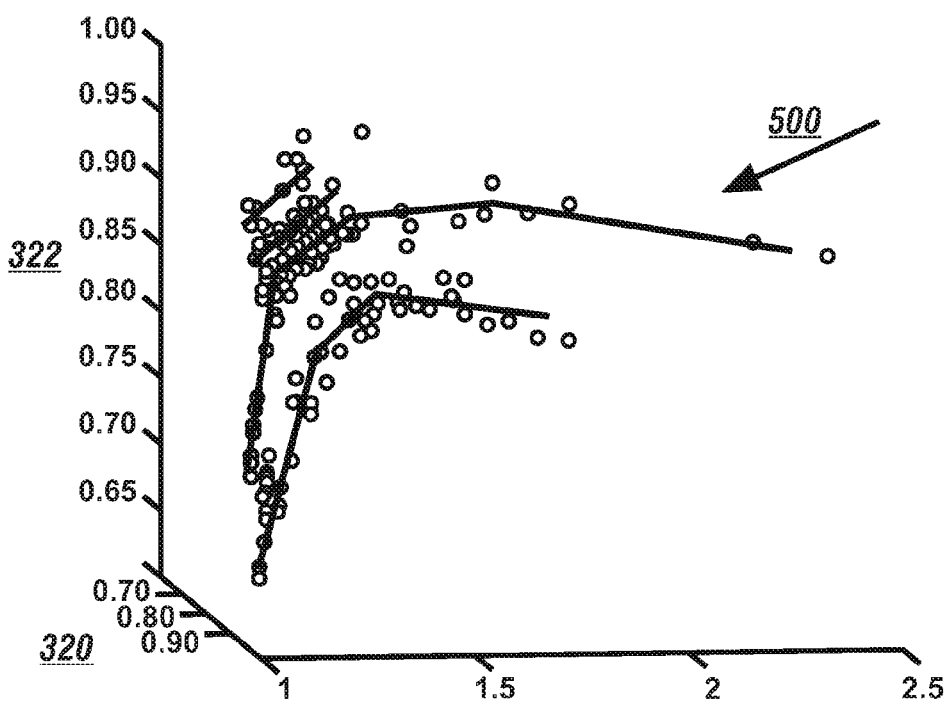
FIG. 5 illustrates an effective volumetric efficiency correlated to the first initial volumetric efficiency and an engine delta pressure in accordance with the present disclosure.

FIG. 5 graphically depicts an example of this relationship. Decomposing the volumetric efficiency of Zone 1 210 associated with the open-throttle condition into the first initial volumetric efficiency $\bar{\eta}_v(a)$ associated with the intake air charge density $x_1$ and the engine speed $x_3$, and normalized for the intake manifold pressure $P_i$, which may be used to determine the effective volumetric efficiency $\eta_v$ corresponding to the first initial volumetric efficiency $\bar{\eta}_v(a)$ and the engine delta pressure $x_2$ permits expression of the relationships depicted in FIGS. 4 and 5 in tabular form as multi-dimensional lookup tables in an engine control module.

When operating in Zone 2 220 associated with the closed-throttle condition, a second initial volumetric efficiency $\bar{\eta}_v(b)$ corresponds to the intake air charge density $x_1$ and the engine delta pressure $x_2$ as graphically depicted in FIG. 6 and in the following relationship.

$$\bar{\eta}_v(b) = g(x_1, x_2) \quad [9]$$

The effective volumetric efficiency $\eta_v$ corresponds to the second initial volumetric efficiency $\bar{\eta}_v(b)$ and the engine speed $x_3$.

$$\eta_v = f(\bar{\eta}_v(b), x_3) \quad [10]$$

Figure 6:
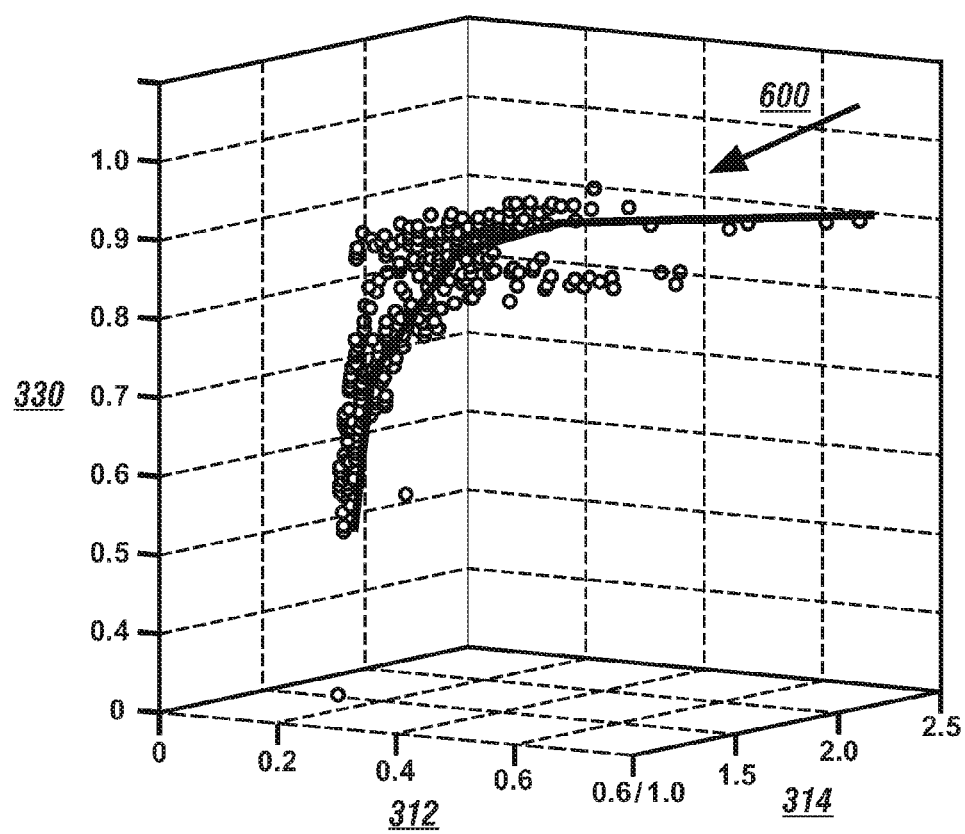
FIG. 6 illustrates a second initial volumetric efficiency correlated to the intake air charge density and the engine delta pressure in accordance with the present disclosure.
Figure 7:
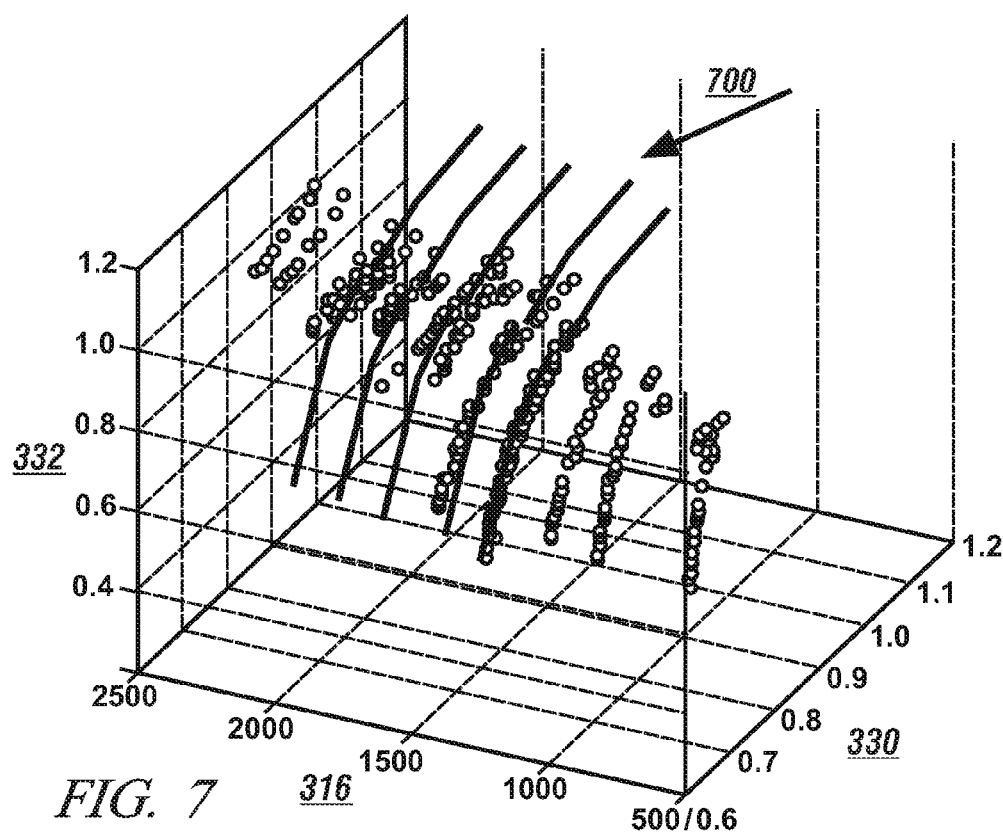
FIG. 7 illustrates an effective volumetric efficiency corresponding to the second initial volumetric efficiency and the engine speed in accordance with the present disclosure.

FIG. 7 graphically depicts an example of this relationship. Decomposing the volumetric efficiency of Zone 2 220 associated with the closed-throttle condition into the second initial volumetric efficiency $\bar{\eta}_v(b)$ associated with the intake air charge density $x_1$ and the engine delta pressure $x_2$, and taking into account the engine speed $x_3$ which may be used to determine the effective volumetric efficiency $\eta_v$ corresponding to the second initial volumetric efficiency $\bar{\eta}_v(b)$ and the engine speed $x_3$ permits expression of the relationships depicted in FIGS. 6 and 7 in tabular form as multi-dimensional lookup tables in an engine control module.

Specific states of the parameters in the relationships depicted in FIGS. 4, 5, 6, and 7 are preferably predetermined for a specific engine system during pre-production development. This allows the parameters to be expressed as executable formulas or in tabular form as multi-dimensional lookup tables in an engine control module for ease of implementation during engine operation.

Figure 3:
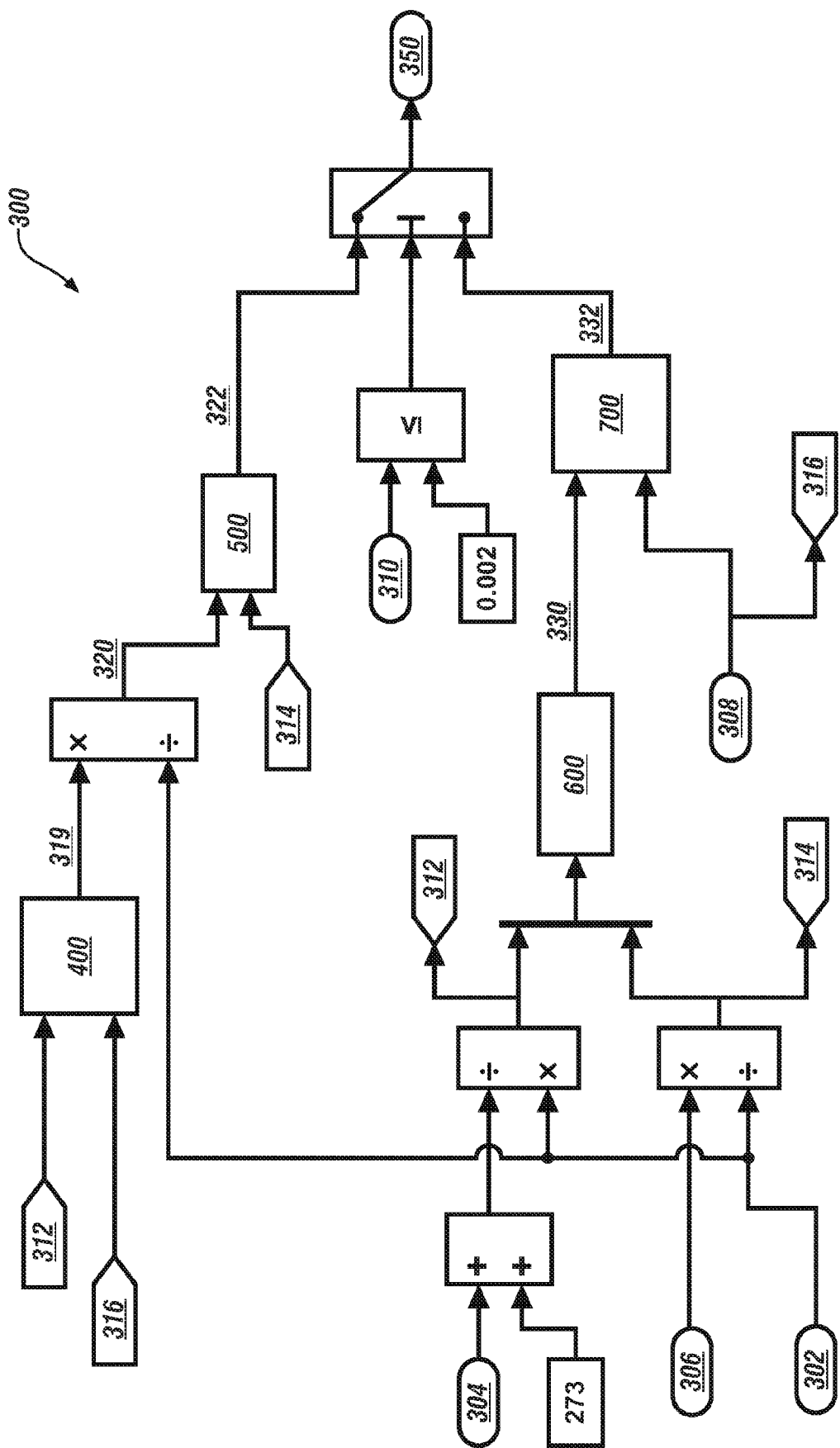
FIG. 3 illustrates a control scheme for determining volumetric efficiency during ongoing engine operation in accordance with the present disclosure.

FIG. 3 schematically shows a control scheme 300 for determining volumetric efficiency during ongoing engine operation using the volumetric efficiencies described herein and Zone 1 210 and Zone 2 220 associated with the throttle position, i.e., one of the open and closed throttle positions. Engine parameters of interest include intake manifold pressure 302, intake manifold temperature 304, exhaust manifold pressure 306, engine speed 308, and throttle position 310. The intake manifold pressure 302 and the intake manifold temperature 304 are combined, as above, to determine the intake air charge density $x_1$ 312. The intake manifold pressure 302 and the exhaust manifold pressure 306 are combined, as above, to determine the engine delta pressure $x_2$ 314. The engine speed 308 is the engine speed $x_3$ 316.

The intake air charge density $x_1$ 312 and the engine speed $x_3$ 316 are input to a first calibration 400 to determine a first parameter 319, which is a combination of the intake manifold pressure 302 and an initial volumetric efficiency $\overline{\eta}_v(a)$ 320, wherein the first calibration 400 is preferably an algorithmic implementation of the relationship depicted in FIG. 4 in either tabular form or as an executable formula. The first parameter 319 is arithmetically divided by the intake manifold pressure 302 to calculate the initial volumetric efficiency $\overline{\eta}_v(a)$ 320. The initial volumetric efficiency $\overline{\eta}_v(a)$ 320 and the engine delta pressure $x_2$ 314 are inputs to a second calibration 500 to determine an open-throttle volumetric efficiency $\eta_v$ 322, wherein the second calibration 500 is preferably an algorithmic implementation of the relationship depicted in FIG. 5 in either tabular form or as an executable formula. When the throttle position 310 indicates the engine is presently operating in an open-throttle condition, the open-throttle volumetric efficiency $\eta_v$ 322 is selected as an operating volumetric efficiency 350 to calculate a cylinder air charge, e.g., using Eq. 2 described herein.

Coincidentally, the intake air charge density $x_1$ 312 and the engine delta pressure $x_2$ 314 are inputs to a third calibration 600 to determine a second initial volumetric efficiency $\overline{\eta}_v(b)$ 330, wherein the third calibration 600 is preferably an algorithmic implementation of the relationship depicted in FIG. 6 in either tabular form or as an executable formula. The second initial volumetric efficiency $\overline{\eta}_v(b)$ 330 and the engine speed $x_3$ 316 are inputs to a fourth calibration 700 to determine a closed-throttle volumetric efficiency $\eta_v$ 332, wherein the fourth calibration 700 is preferably an algorithmic implementation of the relationship depicted in FIG. 7 in either tabular form or as an executable formula. When the throttle position 310 indicates the engine is presently operating in a closed-throttle condition, the closed-throttle volumetric efficiency $\eta_v$ 332 is selected as the operating volumetric efficiency 350 to calculate the cylinder air charge, e.g., using Eq. 2 described herein.

The methods described herein are in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein is merely one suitable example.

It is appreciated that control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for determining a cylinder air charge for an internal combustion engine, comprising:
   determining engine operating parameters comprising an intake air charge density, an engine delta pressure comprising a ratio of an exhaust manifold pressure to an intake manifold pressure, and an engine speed;
   determining an open-throttle volumetric efficiency corresponding to the engine operating parameters;
   determining a closed-throttle volumetric efficiency corresponding to the engine operating parameters; and
   determining a cylinder air charge using a selected one of the open-throttle volumetric efficiency and the closed-throttle volumetric efficiency.

2. The method of claim 1, wherein determining the open-throttle volumetric efficiency comprises:
   determining an initial volumetric efficiency corresponding to the intake air charge density and the engine speed; and
   determining the open-throttle volumetric efficiency corresponding to the initial volumetric efficiency and the engine delta pressure.

3. The method of claim 2, wherein the initial volumetric efficiency is normalized for the intake manifold pressure.

4. The method of claim 2, wherein determining the initial volumetric efficiency comprises determining the initial volumetric efficiency from a predetermined relationship between the intake air charge density and the engine speed.

5. The method of claim 1, wherein determining the closed-throttle volumetric efficiency comprises:
   determining an initial volumetric efficiency corresponding to the intake air charge density and the engine delta pressure; and
   determining the closed-throttle volumetric efficiency corresponding to the initial volumetric efficiency and the engine speed.

6. The method of claim 5, wherein determining the initial volumetric efficiency comprises selecting the initial volumetric efficiency from a predetermined relationship between the intake air charge density and the engine delta pressure.

7. The method of claim 1, wherein the open-throttle volumetric efficiency the closed-throttle volumetric efficiency are coincidentally determined.

8. The method of claim 1, wherein determining the cylinder air charge comprises executing a speed density equation using the selected one of the volumetric efficiencies to estimate the cylinder air charge.

9. Method for determining a cylinder air charge for an internal combustion engine, comprising:
- determining an intake air charge density, an engine delta pressure comprising a ratio of an exhaust manifold pressure to an intake manifold pressure, and an engine speed;
- determining a first initial volumetric efficiency corresponding to the intake air charge density and the engine speed;
- determining an open-throttle volumetric efficiency corresponding to the first initial volumetric efficiency and the engine delta pressure;
- determining a second initial volumetric efficiency corresponding to the intake air charge density and the engine delta pressure;
- determining a closed-throttle volumetric efficiency corresponding to the second initial volumetric efficiency and the engine speed; and
- determining a cylinder air charge using a selected one of the open-throttle volumetric efficiency and the closed-throttle volumetric efficiency.

10. The method of claim 9, wherein the first initial volumetric efficiency is normalized for the intake manifold pressure.

11. Method for determining a cylinder air charge for an internal combustion engine, comprising:
- determining an intake air charge density, an engine delta pressure comprising a ratio of an exhaust manifold pressure to an intake manifold pressure, and an engine speed;
- determining a first initial volumetric efficiency as a function of the intake air charge density and the engine speed and normalized for the intake manifold pressure;
- determining an open-throttle volumetric efficiency as a function of the first initial volumetric efficiency and the engine delta pressure;
- determining a second initial volumetric efficiency as a function of the intake air charge density and the engine delta pressure;
- determining a closed-throttle volumetric efficiency as a function of the second initial volumetric efficiency and the engine speed;
- selecting one of the open-throttle volumetric efficiency and the closed-throttle volumetric efficiency based on an engine throttle position; and
- executing a speed density equation using the selected one of the volumetric efficiencies to estimate a cylinder air charge.

* * * * *